United States Patent
Mera et al.

(10) Patent No.: US 6,265,515 B1
(45) Date of Patent: Jul. 24, 2001

(54) FLUORINATED SILICONE RESIN FOULING RELEASE COMPOSITION

(75) Inventors: Ann E. Mera, Huntingtown, MD (US); Kenneth J. Wynne, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/332,528

(22) Filed: Jun. 14, 1999

(51) Int. Cl.$^7$ .......................... C08G 77/06; C08G 77/24; C08Z 83/08; C09D 5/16
(52) U.S. Cl. ................... 528/25; 528/14; 528/15; 528/19; 528/31; 528/33; 528/36; 528/42; 528/485; 528/495; 528/901; 525/474; 525/479; 428/447; 106/15.05
(58) Field of Search ...................... 525/474, 479; 528/14, 15, 19, 25, 31, 33, 36, 42, 901, 485, 495; 428/447; 106/15.05

(56) References Cited

U.S. PATENT DOCUMENTS

| | | |
|---|---|---|
| 3,846,358 | 11/1974 | Roedel . |
| 4,355,149 * | 10/1982 | Koda et al. ............................ 528/18 |
| 4,574,149 | 3/1986 | Lee et al. . |
| 4,736,048 | 4/1988 | Brown et al. . |
| 4,818,805 | 4/1989 | Ikeno et al. . |
| 4,824,983 | 4/1989 | Fink et al. . |
| 4,861,670 | 8/1989 | Lampe et al. . |
| 5,118,775 * | 6/1992 | Inomata et al. ....................... 528/12 |
| 5,218,059 | 6/1993 | Kishihara et al. . |
| 5,241,034 | 8/1993 | Hersig et al. . |
| 5,288,891 | 2/1994 | Sawada et al. . |
| 5,300,670 | 4/1994 | Kobayashi . |
| 5,593,732 | 1/1997 | Griffith . |
| 5,639,845 | 6/1997 | Inomata et al. . |
| 5,691,019 | 11/1997 | Carroll et al. . |
| 5,904,988 * | 5/1999 | Stein et al. ............................ 428/447 |
| 5,958,116 * | 9/1999 | Kishihara et al. ................ 106/15.05 |
| 6,107,381 * | 8/2000 | Stein et al. ............................ 524/265 |
| 6,127,504 * | 10/2000 | Fukuda et al. ........................ 528/15 |

* cited by examiner

*Primary Examiner*—Robert Dawson
*Assistant Examiner*—Jeffrey B. Robertson
(74) *Attorney, Agent, or Firm*—John J. Karasek; Amy L. Ressing

(57) ABSTRACT

An antifoulant composition includes a fluorinated silicone resin:

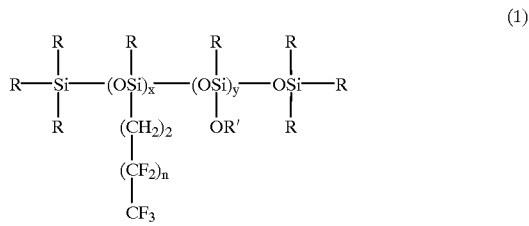

(1)

wherein R is the same or different group and stands for an alkyl of 1 to 10 carbon atoms, R' is H or a lower alkyl of 1 to 10 carbon atoms, n is 2 to 10, x is at least 1 and y is at least 2.

31 Claims, No Drawings

FLUORINATED SILICONE RESIN FOULING RELEASE COMPOSITION

BACKGROUND OF THE INVENTION

1. Field of the Invention

The present invention relates generally to silicon resin fouling release coatings, and more specifically to fluorinated silicone resin antifoulant compositions.

2. Background of the Invention

Aquatic animal and plant organisms such as barnacles, oysters, ascidians, polyzoans, serupulas, sea lettuces and green layers adhere and grow on the surface of marine structures, resulting in various damage. For example, the aquatic organisms can adhere onto the bottom of a ship to increase the frictional resistance between the ship body and water. The increased resistance results in increased fuel costs. Some industrial plants use sea water for cooling. Fouling of intake pipes by aquatic animals and plants can hinder the induction of cooling water resulting in a drop in cooling effectiveness. A wide range of marine structures such as undersea construction, piers, buoys, harbor facilities, fishing nets, ships, marine tanks, water conduit raceway tubes of power plants and coastal industrial plants are affected.

Marine organisms initially are attracted to and subsequently attach to a surface by chemical and physical means. Biopolymers such as polypeptides and polysaccharides comprise the outermost layer of marine organisms, and in some cases the marine organism exudes a "glue" (which is typically comprised of similar material) by which it attaches to a substrate. Biopolymers are very polar, and initial physical attachment to a substrate is facile when the substrate contains polar groups to which these biopolymers can hydrogen-bond. Further chemical attachment can take place by reactions between the biopolymers and a substrate. A hydrophobic surface is one which contains very little to no polar groups; thus, a hydrophobic surface expresses very few "toeholds" for marine organisms to adhere. The only type of attraction would be Van der Waals attractions, which are very weak.

Various antifouling compositions have been developed to prevent the adherence of the aquatic organisms. Toxicants containing copper, tin, arsenic and mercury and various compounds of the same have been proposed. Other proposed materials include strychnine, atropine, oxides of zinc, lead and antimony, creosote, phenol, metallic silver, iodine, bromine and mixtures of iron, copper and zinc powders. Of the above compositions, only three groups, namely cuprous, tin and mercury compounds, have been useful, even to a limited degree. However, even the effective compositions have disadvantages. These compositions prevent fouling by a toxic mechanism. Effectiveness of the compositions requires that a lethal concentration of poison be maintained in the water immediately adjacent to the surface of the marine structure Eventually, the poison is completely leached into the water and the composition is exhausted and must be replaced. Further, the poisons are toxic to humans and can be a major source of pollution in busy harbors and in waterways.

Fouling release coatings, that is coatings which do not allow organisms to adhere to the marine body surface have been proposed as alternatives to the toxicity-based antifoulants. Lampe et al., U.S. Pat. No. 4,861,670 discloses a silicone fouling release composition. Silicones are based on polymers comprised of a backbone of silicon-oxygen-silicon atoms linked together. They are thus different chemically from organic materials which are based on polymers comprised of a backbone of carbon-to-carbon atoms linked together. It is this difference—the silicon-oxygen linkage—which accounts for the unique properties of silicones. The silicone based linkage imparts both high temperature resistance and stability toward many deteriorating influences such as ozone, chemicals, environment and radiation. The silicones are generally comprised of linear silicone resins which possess two or more crosslinking sites. Typically the sites are hydroxy functional. The silicones are cured by crosslinking at the sites. Typically, the crosslinking is achieved through the addition of a crosslinking agent such as a multi-functional alkoxy silane such as alkylmethoxy silane and tetraethoxy silane.

However, the silicones have certain disadvantages. First, while typical silicone surface energy at 20–24 dynes/cm is marginally low enough for an effective release coating, other materials are known with lower surface energy that could be more effective as fouling release coatings. Second, in time, hydrophilic sites migrate to the surface of the silicone coatings to decrease the coating surface hydrophobicity. Third, silicones do not provide durable, long-life coatings because of low tear strength. Fourth, residual by products from resin syntheses and performance additives in the silicones contribute to marine pollution by leaching into the water.

There remains a need for a coating that has effective fouling release properties, is hydrophobic, durable and non polluting.

SUMMARY OF THE INVENTION

The invention relates to a curable fluorinated silicone resin formed by replacing some but not all of SiH groups in an end-capped fluoroalky group containing polyalkylhydrosiloxane. The remaining unreacted SiH groups are converted to Si—OH groups or to Si—OR groups for crosslinking. The converted groups can react with added water, trialkoxymethyl silane or tetraalkoxy silane to form an elastomeric network polymer. In one embodiment, the fluorinated silicon resin is blended with a nonfluorinated organopolysiloxane resin prior to crosslinking.

The curable fluorinated silicone resin of the invention comprises:

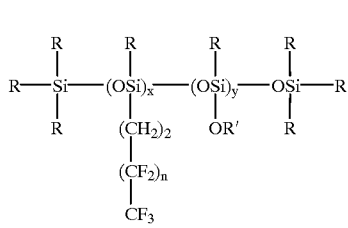

(1)

wherein R is the same or different group and stands for an alkyl of 1 to 10 carbon atoms, R' is H or a lower alkyl of 1 to 10 carbon atoms, n is 2 to 10, x+y=z, where z is 3 to 200, x is 50 to 95% of z and y is 50 to 5% of z.

The curable fluorinated silicone resin of the invention and blends of the curable fluorinated silicone resin provide highly effective, low surface energy fouling release compositions. The resin does not preform by a sacrificial leaching mechanism. Hence, it is effective over extended time periods and is non-toxic to the environment.

The invention also relates to a method of preparing the curable fluorinated silicone resin comprising reacting a polyalkylhydrosiloxane of the formula:

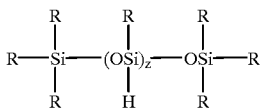
(2)

with an unsaturated fluoroalkyl of the formula:

$$CH_2=CH(CF_2)_nCF_3 \qquad (3)$$

wherein z, x, y, n, R and R' are as defined for (1), to produce a fluoroalkyl containing organosilane. The silane groups of the fluoroalkyl containing organosilane are then converted to crosslinkable alkoxy or hydroxy functionalities.

In another aspect, the invention relates to a fouling release composition comprising the curable fluorinated silicone resin of the formula (1) or its crosslinked product or the crosslinked product of the crosslinking reaction of the curable fluorinated silicone resin formula (1) with a nonfluorinated organopolysiloxane resin.

DESCRIPTION OF THE PREFERRED EMBODIMENTS

According to the invention, an unsaturated fluoroalkyl is reacted with a polyalkylhydrosiloxane to replace SiH groups of the polymethylhydrosiloxane with fluoroalkyl groups. Unreacted SiH groups are converted to crosslinkable Si—OR or Si—OH groups. The resulting curable fluorinated silicone resin is used as a curable ship fouling release composition.

The first step of the process of producing the curable fluorinated silicone resin comprises reacting a polyalkylhydrosiloxane of the formula:

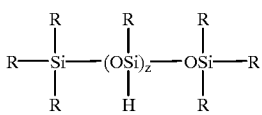
(2)

with an unsaturated fluoroalkyl of the formula:

$$CH_2=CH(CF_2)_nCF_3 \qquad (3)$$

wherein wherein R is the same or different group and stands for an alkyl of 1 to 10 carbon atoms, desirably 1 to 5 carbon atoms and preferably 1 to 3 carbon atoms; n is 2 to 10, desirably 2 to 7 and preferably 2 or 3; z (the number of repeat units in the polymer) is 3 to 200, desirably 10 to 100 and preferably 20 to 30; x is 50 to 95% of z, desirably 60 to 90% of z and preferably 75 to 90% of z; and y is 50 to 5% of z, desirably 40 to 10% of z and preferably 25 to 10% of z. The reaction produces a fluoroalkyl group containing polyalkylhydrosiloxane of the following formula:

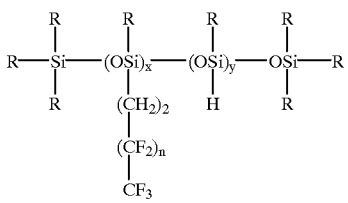
(4)

wherein R, n, x and y are as defined above. Examples of suitable polyalkylhydrosiloxanes (2) include polymethylhydrosiloxane, methylhydro-dimethylsiloxane copolymers, polyethylhydrosiloxane and methylhydrosiloxane-octylmethylsiloxane copolymers. Polymethylhydrosiloxanes of molecular weight of about 1660 to about 3160 are preferred polyalkylhydrosiloxanes (2). Examples of suitable unsaturated fluoroalkyls (3) include 1H-1H-2H-perfluorohexene (nonafluorohexene), 1H-1H-2H-perfluoroheptene, 1H-1H-2H-perfluorooctene, 1H-1H-2H-perfluorononene and 3, 3, 4, 4, 5, 5, 5-heptafluoro-1-pentene.

In the first step of the process, the polyalkylhydrosiloxane of the formula (2) is reacted with an unsaturated fluoroalkyl of the formula (3) at a temperature in the range of about 0° to 70° C. Desirably, the reaction temperature is in the range of about 10° to 50° C. and preferably is about room temperature (about 20° to about 25° C.). The reaction is conducted for a period between about 2 to 10 days, desirably about 3 to about 7 days and preferably about 5 days. The molar proportion of fluoralkene to the —SiH groups is controlled between about 1 to about 2, desirably between about 1.2 to about 1.9 and preferably between about 1.5 to about 1.8. Suitable catalysts include rhodium complexes such as $RhCl(PPh_3)_3$, $RhCl(CO)(PPh_3)_2$, metal carbonyls such as carbonyls of nickel, rhodium, iron, ruthenium, manganese, iridium, chromium and molybdenum. The amount of the catalyst expressed as a weight % of the amount of polyalkylhydrosiloxane, can be about 0.5 to about 15% and desirably about 5 to about 10%. The preferred catalyst is dicobalt octacarbonyl in a proportion of about 10 weight %.

The Si—H groups of (4) are then converted to Si—OH or Si—OR' groups to produce the curable fluorinated silicone resin (1). In this step, (4) is reacted with an alcohol or alcohols in the presence of an organic transition metal salt catalyst. The alcohol is characterized by at least one —OR group wherein R is an alkyl of 1 to 10 carbons. Desirably, R is an alkyl of 1 to 3 carbons and preferably the alcohol is methanol. Suitable transition metal salt catalysts include cobalt octoate and copper naphthenate. Zinc octoate is the preferred catalyst. A molar excess of methanol is used so that all SiH groups are converted. The reaction can be monitored by IR for the disappearance of the Si—H band (2165 cm$^{-1}$) to assure complete conversion. The temperature of the reaction can be between about 0° to about 70° C., desireably about 10° to about 50° C. and preferably about 20° to about 25° C. for a period of time to convert the Si—H groups.

The fluorinated silicon resin (1) is then crosslinked either by crosslinking of molecules of the silicon resin (1) or with molecules of another component. The crosslinking reaction can be conducted at a reaction temperature between about 0° to about 70° C., desireably about 10° to about 50° C. and preferably about 20° to about 25° C. until the resin is cured. In the case the crosslinking is with another component, the component can be an alkyltriethoxysilane such as methyl triethoxysilane or octyl triethoxysilane or a tetraethoxysilane. A fluoroalkyltriethoxysilane is a preferred crosslinking monomer. The amount of crosslinking monomer can vary from 5 to 40% by weight.

In one embodiment, the invention relates to fouling release compositions such as disclosed by Carroll et al. U.S. Pat. No. 5,691,019, the disclosure of which is incorporated herein by reference. A composition of the invention can include a substrate, an adhesion promoting layer and the fouling release composition. Additionally, the invention includes a method comprising applying the adhesion promoting layer to a substrate, allowing it to cure and applying the release layer and allowing it to cure.

Any material used as a marine structure can be used as the substrate in the present invention. Such materials include boat building materials, such as stainless steel, aluminum, wood and resin impregnated fiberglass and any other composite material. Also included are materials such as concrete, plastic, steel and iron. Examples of marine structures include undersea construction, piers, buoys, harbor facilities, fishing nets, ship marine tanks and other water holding tanks including swimming pools, water conduit raceway tubes of power plants and coastal industrial plants.

The substrate can be coated with an anticorrosive layer prior to application of the adhesive promoting layer. The anticorrosive layer can be an anticorrosive material including any material which inhibits corrosion or degradation from reaction of the substrate with the environment. For example, the anticorrosive layer can be a two part material comprising an epoxy functionality and a curing catalyst.

Suitable adhesion promoting layers include a moisture curable grafted copolymer that further includes polydialkylsiloxane and one or more ethylenically unsaturated monomers. Preferably, the polydialkylsiloxane comprises polydimethylsiloxane. One or more ethylenically unsaturated monomers are grafted onto the polydialkylsiloxane by a free radical process. Suitable ethylenically unsaturated monomers include butyl acrylate, styrene, vinyl chloride and vinylidene chloride.

If the bonding agent comprises a moisture curable grafted copolymer and the adhesion promoting layer is to be applied on to an anticorrosive layer, the adhesion promoting layer can comprise 85–95% by weight moisture curable grafted copolymer.

If the bonding agent comprises a moisture curable grafted copolymer and the adhesion promoting layer is to be applied onto an anticorrosive layer, the adhesion promoting layer comprises 85–95% by weight moisture curable grafted copolymer with the balance being anticorrosive material. Preferably, the adhesion promoting layer comprising the moisture curable grafted copolymer is applied directly onto the substrate and no anticorrosive layer is used. In that case, the adhesion promoting layer comprises 2–10% by weight moisture curable grafted copolymer with the balance being anticorrosive material. In either case, the thickness of the adhesion promoting layer can be 0.10 to 0.75 mm.

The adhesion promoting layer can also comprise an amino-functionalized polysiloxane fluid. The amino-functionalized polysiloxane fluid includes materials marketed by GE Silicones under the tradenames SF1708 and SF1927. When the adhesion promoting layer includes an amino-functionalized polysiloxane fluid, the amino-functionalized polysiloxane fluid and anticorrosive material are mixed in proportions such that there is no visible phase separation and the two materials appear homogeneously mixed. Preferably, the adhesion promoting layer comprises 20% by weight or less amino-functionalized polysiloxane fluid, with the balance comprising anticorrosive material. The thickness of the adhesion promoting layer can be 0.10 to 0.75 min.

The adhesion promoting layer can also include an α, Ω-diaminofunctionalized polysiloxane fluid. In this instance, the α, Ω-diaminofunctionalized polysiloxane fluid and anticorrosive material are mixed in proportions such that there is no visible phase separation and the two materials appear homogeneously mixed. Preferably the adhesion promoting layer comprises about 20% by weight or less α, Ω-diaminofunctionalized polysiloxane fluid, with the balance comprising anticorrosive material. The thickness of the adhesion promoting layer can be 0.10 to 0.75 mm.

If the adhesion promoting layer is the amino-functionalized polysiloxane fluid or α, Ω-diaminofunctionalized polysiloxane fluid, it is preferred to apply an anticorrosive layer before applying the adhesion promoting layer.

Solvent may be mixed into the adhesion promoting layer to make it easier to apply to the substrate. The adhesion promoting layer can include up to 20% by weight solvent with the balance being bonding agent and anticorrosive material. There are many suitable solvents. For example, suitable solvents include naphtha, mineral spirits, isopropanol, xylene and toluene.

The release layer comprises the curable fluorinated silicone resin of the present invention. In another embodiment, the release layer comprises the product of the partially fluorinated silicone resin of the present invention crosslinked with an organosiloxane. In this instance, the lower surface energy fluorinated silicone resin moiety migrates to the product surface where it is "locked" in place by the crosslinkages. This provides a particularly advantageous foulant release composition. The organosiloxanes are less expensive than many of the present fluorinated silicones. Migration of the fluorinated silicones to the product surface where they are most effective as release agents, provides a combined coating release composition at less cost than a totally fluorinated resin system.

In this instance, the foulant release composition can comprise 0–20% by weight moisture cured crosslinked fluorinated silicone resin of the present invention with the balance being organopolysiloxane. Suitable organopolysiloxanes are well known in the art. Preferably, the organopolysiloxane is a two part, room temperature vulcanized, cured polydimethylsiloxane. It can be filled with materials such as fumed silica and calcium carbonate. Preferably, the vulcanization is catalyzed with tin or with titanium. The release layer can be 0.25 mm to 0.75 mm thick.

Each of the anticorrosive layer, the adhesion promoting layer and the release layer, can be applied by methods well known in the art. Such methods include brushing, spraying, dipping, rolling or any means normally used to apply paint. If an anticorrosive layer is applied to the substrate, it is cured at ambient temperature and humidity until it is dry to the touch. Preferably, the anticorrosive layer is cured for at least 24 hours at about 20° C.–30° C. and about 40–60% relative humidity.

After application of the adhesion promoting layer, it can be cured for 48 hours or less at ambient temperature and humidity. Preferably, the adhesion promoting layer is cured for 24 hours or less at 20°–30° C. and 40–60% relative humidity. If the adhesion promoting layer includes an amino-functionalized polysiloxane fluids or α, Ω-diaminofunctionalized polysiloxane fluid, it is more preferred that the adhesion promoting layer is cured for 6 hours or less at 20.degree.–30.degree. C. and 40–60% relative humidity.

The release layer is applied directly to the adhesion promoting layer. The release layer can be cured for at least 18 hours at ambient temperature and humidity. Preferably, the release layer is cured for at least 24 hours at ambient temperature and humidity. More preferably, the release layer is cured for at least 72 hours at 20°–30° C. and 40–60% relative humidity. If the release layer is cured for less than 72 hours, the adhesion promoting layer preferably comprises 6–10% by weight moisture curable grafted copolymer with the balance being anticorrosive material. More preferably, the release layer is cured for 72 hours or more, in which case, the adhesion promoting layer can comprise 2–10% by weight moisture curable grafted copolymer with the balance being anticorrosive material.

These and other features will become apparent from the detailed discussion which follows, which by way of example without limitation, describes preferred embodiments of the present invention.

EXAMPLE 1

Materials

Trimethylsilyl end capped poly(methylhydrosiloxane) (PMHS) was obtained from Aldrich. $^1$H NMR analysis showed the average degree of polymerization to be 25 (average molecular weight 1660). 1H-1H-2H-Perfluorohexene (nonafluorohexene, NFH) was obtained from PCR. Octacarbonyldicobalt ($Co_2(CO)_8$) was obtained from Alfa Aesar. Zinc octoate was obtained from Nuodex, Inc. as a solution in mineral spirits containing 16% zinc (NuXtra Zinc 16%). Dibutyltindiacetate (DBTDA) was obtained from Aldrich. All were used as received. 1, 1, 2-Trichlorotrifluoroethane (Freon 113, F-113) was obtained from Aldrich and used as received. Toluene was obtained from Fisher Scientific and purified and dried by standard methods; it was stored in the dark under nitrogen over sodium pellets prior to use.

Instruments $^1$H NMR spectra were recorded on a Bruker AM 300 spectrometer operating at 300 MHZ; chemical shifts were reported in parts per million (ppm) down field from tetramethylsilane. IR spectra were recorded on aNicolet Magna FTIR Spectrometer. Contact angles were measured using an AST 2500 Video Contact Angle System (VCA). Three test liquids (1–2 μL sessile drops) were used; triply-distilled water ($H_2O$), 99% methylene iodide ($CH_2I_2$), and 99+% spectrophotometric grade formamide ($HCONH_2$). Contact angles were reported as the average of 8–10 measurements.

Synthesis of Fluorosilicone from PMHS

In a dry nitrogen-purged glove bag, 0.2 g $Co_2(CO)_8$ was weighed into a 15 ml round bottom flask equipped with a stir bar. The flask was stoppered and removed from the glove bag. Dry toluene (4 ml) was added and the mixture was stirred until all catalyst was dissolved. In a nitrogen-filled 50 ml round bottom flask equipped with a stir bar was placed 2.0 ml PMHS (30.6 mmol Si—H), 9.0 ml NFH (53.3 mmol) and 7 ml dry toluene. The $Co_2(CO)_8$ solution was added with stirring to the reaction flask via syringe. Stirring under nitrogen at room temperature was continued for 5 days. Upon completion of reaction, the flask was placed on a rotary evaporator and excess NFH and toluene removed to give 7.80 g of a dark colored polymer. $^1$H NMR (in $CDCl_3$/F-113): 4.7 ppm, s, Si—H; 2.1 ppm, brm, Si—$CH_2$—$CH_2$—$CF_2$—; 0.8 ppm, brs, Si—$CH_2$—$CH_2$—$CF_2$,—; 0.2 ppm, s, Si—$CH_3$ ($CDCl_3$=deuterated chloroform from Aldrich; s=singlet; brs=broad singlet and brm=broad multiplet). Integration yielded approximately 75% fluoroalkyl groups and 25% Si—H groups. Excess $CO_2(CO)_8$ catalyst and Co residues were removed by dissolving the polymer in F-113 and extracting with methanol until the methanol layer remained colorless. The polymer solution was then centrifuged and decanted from precipitated Co metal. F-113 was removed via rotary evaporation to give 6.95 g of a light pink liquid. $^1$H NMR (in $CDCl_3$/F-113): 4.7 ppm, s, Si—H; 3.5ppm, s, $SiOCH_3$; 2.1 ppm, brm, Si—$CH_2$—$CH_2$—$CF_2$—; 0.8 ppm, brs, Si—$CH_2$—$CH_2$—$CF_2$—; 0.2 ppm, s, Si—$CH_3$. Integration yielded approximately 77% fluoroalkyl groups, 12% Si—H groups and 11% Si—$OCH_3$ groups. IR (neat polymer on KBr): 2967, 2913 $cm^{-1}$, m, Si—$CH_3$ and $CH_2$; 2846 $cm^{-1}$, w, Si—$OCH_3$; 2165 $cm^{-1}$, m, Si—H; 1300–1000 $cm^{-1}$, many bands, vs, Si—O—,$CF_2$, and $CF_3$ (vs=very strong; m=moderate; w=weak).

Conversion of Residual Si—H Groups to Si—OMe Groups

In a nitrogen-filled 100 ml round bottom flask equipped with a stir bar was placed 6.78 g polymer (from above), 35 ml F-113, 3.5 ml dry methanol and 0.3 ml zinc octoate catalyst solution. The reaction mixture was stirred under nitrogen at room temperature and aliquots were removed periodically and checked by IR for disappearance of Si—H band (2165 $cm^{-1}$). Once the reaction was complete (typically 7–14 days), the solution was poured into a separatory funnel and extracted with water to remove methanol and zinc octoate catalyst. F-113 was removed via rotary evaporation, to give 6.10 g of a whitish liquid. $^1$H NMR (in $CDCl_3$/F-113): 3.5 ppm, s, Si—$OCH_3$; 2.1 ppm, brm, Si—$CH_2$—$CH_2$—$CF_2$—; 0.8 ppm, brs, Si—$CH_2$—$CH_2$—$CF_2$—; 0.2 ppm, s, Si—$OCH_3$. Integration yielded approximately 80% fluoroalkyl groups and 20% Si—$OCH_3$ groups. IR (neat polymer on KBr): 2967, 2913 $cm^{-1}$, m, Si—$CH_3$ and $CH_2$; 2846 cm-', m, Si—$OCH_3$; 1300–1000 cm-', many bands, vs, Si—O—, $CF_2$ and $CF_3$.

Network Formation

A catalyst solution was made containing 5% DBTDA in methylisobutyl ketone (MIBK). In a vial equipped with a stir bar, was placed either methoxy-functional fluorosilicone by itself (self-cure) or methoxy-functional fluorosilicone and a crosslinker. Catalyst solution was added to give 1 wt % DBTDA, then 2–3 µL water was added. The mixture was stirred at room temperature until viscosity began to significantly increase; the mixture was then poured into aluminum planchettes. Samples were allowed to cure under high humidity conditions until set and non-tacky. For self-cured polymers this took about 1 week; for polymers with added crosslinker cure times varied.

EXAMPLE 2

The following amounts of reactants were used in the same procedures as in Example 1: 1.2 ml PMHS (18.4 mmol SiH), 4.1 ml 3, 3, 4, 4, 5, 5, 5-heptafluoro-1-pentene (HFP, 27 mmol), 0.12 g $Co_2(CO)_8$ and 4 ml toluene. After workup with MeOH to remove catalyst and Co, 2.59 g of a light pink liquid was obtained. $^1$H NMR (peaks identical to those for the nonafluorohexyl side chain polymer) showed 75% fluoroalkyl groups, 5% Si—OMe groups and 20% SiH groups. IR was very similar to that for the nonafluorohexyl side chain polymer, major bands were the same.

Then the same second step procedure as Example 1 was conducted using 2.55 g polymer from step 1, 13 ml Freon-113, 1.3 ml methanol and 0.16 g zinc octoate catalyst solution. This step produced 2.50 g of a white liquid. $^1$H NMR (peaks identical to those for the nonafluorohexyl side chain polymer) showed 74% fluoroalkyl groups and 26% Si—OMe groups. The IR was very similar to that for the nonafluorohexyl side chain polymer, major bands were the same.

The data reported in the following Tables illustrate the influence of catalyst and reaction scale on degree of fluoroalkylation. Different amounts of catalyst were used as shown in Table 1. For both Tables, % Falkyl (% of fluoroalkyl substitution) was determined by $^1$H NMR.

TABLE 1

| PMHS (ml) | $Co_2(CO)_8$ (g) | % Falkyl |
|---|---|---|
| 2 | 0.2 | 78 |
| 2 | 0.1 | 70 |
| 2 | 0.012 | 39 |

TABLE 2

| PMHS (ml) | $Co_2(CO)_8$ (g) | % Falkyl |
|---|---|---|
| 1 | .1 | 90 |
| 2 | .2 | 78 |
| 4 | .4 | 55 |

The data in the Tables show that 10% catalyst gives the highest degree of fluoroalkyl substitution (Table 1) and that smaller reaction scale gives a higher degree of fluoroalkyl substitution (Table 2).

EXAMPLE 3

The following contact angle measurements were made and surface energies calculated. Contact angles were measured on cured films via goniometry using a VCA system. Results, along with calculated surface energies are given in Table 3. The surface energies were calculated using the harmonic method. In the Table, W=water; F=formamide; and M=methylene iodide. For added crosslinker, the abbreviations are as follows: TEOS=tetraethoxysilane; OTEOS=octyltriethoxysilane; FTEOS=(tridecafluoro-1,1,2,2-tetrahydrooctyl)triethoxysilane.

TABLE 3

| Added Crosslinker | Contact Angles (°) | | | Surface Energy (dynes/cm) |
|---|---|---|---|---|
| | W | F | M | |
| none self-cure | 116 | 113 | 94 | 13.8 |
| none self-cure | 119 | 112 | 92 | 13.7 |
| none self-cure | 117 | 110 | 94 | 13.7 |
| 10 wt % TEOS | 113 | 107 | 90 | 15.1 |
| 10 wt % OTEOS | 113 | 104 | 91 | 15.6 |
| 10 wt % FTEOS | 116 | 110 | 95 | 13.6 |
| 20 wt % FTEOS | 118 | 112 | 97 | 12.9 |
| 30 wt % FTEOS | 121 | 112 | 95 | 10.7 |
| 40 wt % FTEOS | 131 | 119 | 99 | (<10.7) |

The data in Table 3 show that the surface energies of the cured fluorosilicones are lower than the surface energies of conventional silicones and that increasing the amount of fluorine in the system (by increasing the amount of fluorinated crosslinker) decreases surface energy even further.

EXAMPLE 4

The following weight loss studies were conducted.

Rectangular (approximately ½"×¾") samples were cut from cured films and immersed in distilled water spiked with 200 ppm sodium azide. The examples were removed weekly, allowed to dry for 4 hours, weighed and reimmersed in fresh distilled water spiked with 200 ppm sodium azide.

Two self-cured samples and samples containing 10, 20, 30 and 40 wt % FTEOS and 10 wt % OTEOS were immersed in water. Over an 8 week period, all samples lost 0.7–0.9 wt % with little difference in weight loss among the samples. The following Table 4 shows average weight loss of the samples over the eight week period.

TABLE 4

| Wt % loss week 1 | Wt % loss week 2 | Wt % loss week 3 | Wt % loss week 4 | Wt % loss week 5 | Wt % loss week 6 | Wt % loss week 7 | Wt % loss week 8 |
|---|---|---|---|---|---|---|---|
| 0.16 | 0.18 | 0.12 | 0.08 | 0.06 | 0.06 | 0.07 | 0.03 |

The data show that the coatings approached a 0% weight loss rate.

EXAMPLE 5

The following fouling release study was conducted.

A 4"×5" fiberglass panel was coated with a self-cure fluorosilicone with 55% nonafluorohexyl groups. The panel was immersed in the Chesapeake Bay for fifteen months except in the winter when the panel was removed monthly, examined, cleaned and reimmersed. A similarly cured polydimethylsiloxane-based coating was used as a control. Qualitative measurements were made on the extent of fouling and ease of fouling removal. Fewer barnacles and less encrusting bryozoans settled on the fluorosilicone panel than on the control. However, the level of algal fouling was greater for the fluorosilicone. All fouling was easily removed from both panels by wiping with a damp sponge. The fouling species which are typically harder to remove are barnacles and bryozoans. Very little bryozoans settled on the fluorosilicone and barnacles that did settle were easier to remove from the fluorosilicone. With the control, some barnacles "undercut" the coating and attached directly to the underlying substrate. This did not occur with the fluorosilicone.

While preferred embodiments of the invention have been described, the present invention is capable of variation and modification and therefore should not be limited to the precise details of the examples. The invention includes changes and alterations that fall within the purview of the following claims.

What is claimed is:

1. A curable, crosslinkable fluorinated silicone resin comprising:

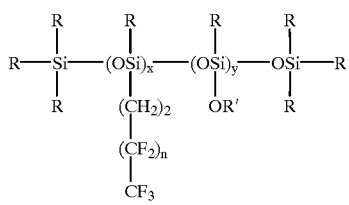

(1)

wherein R is the same or different group and stands for an alkyl of 1 to 10 carbon atoms, R' is H or a lower alkyl of 1 to 10 carbon atoms, n is 2 to 10, x+y=z, where z is 3 to 200, x is 50% to 95% of z and y is 5% to 50% of z.

2. The curable fluorinated silicon resin of claim 1, wherein R is the same or different group and stands for an alkyl of 1 to 5 carbon atoms, n is 2 to 7, z is 10 to 100, x is 60% to 90% of z and y is 10% to 40% of z.

3. The curable fluorinated silicon resin of claim 1, wherein R is the same or different group and stands for an alkyl of 1 to 3 carbon atoms, n is 2 or 3, z is 20 to 50, x is 75% to 90% of z and y is 10% to 25% of z.

4. A method of preparing the curable fluorinated silicone resin of claim 1 comprising reacting a hydroalkylsiloxane of the formula:

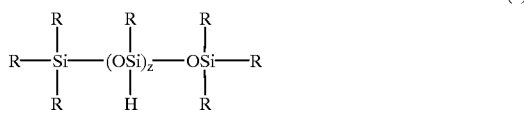

(2)

with an unsaturated fluoroalkyl of the formula:

$$CH_2=CH(CF_2)_nCF_3 \qquad (3)$$

to produce a fluoroalkyl group containing polyalkylhydrosiloxane of the following formula:

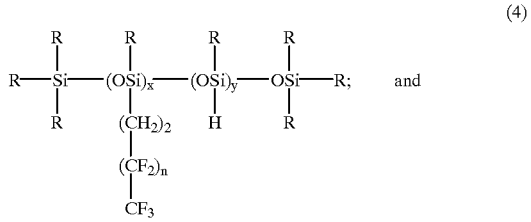

(4)

and converting SiH groups of (4) to Si—OH or Si—OR' groups to produce said curable fluorinated silicone resin (1).

5. The method of claim 4, wherein said hydroalkylsiloxane of formula (2) is reacted with said unsaturated fluoroalkyl of the formula (3) at a temperature in the range of about 0° C. to 70° C., for a period between about 2 to 10 days.

6. The method of claim 4, wherein said hydroalkylsiloxane of formula (2) is reacted with said unsaturated fluoroalkyl of the formula (3) at a temperature in the range of about 10° C. to 50° C., for a period between about 3 to about 7 days.

7. The method of claim 4, wherein said hydroalkylsiloxane of formula (2) is reacted with said unsaturated fluoroalkyl of the formula (3) at a temperature in the range of about 20° C. to about 25° C., for a period of about 5 days.

8. The method of claim 4, wherein said unsaturated fluoroalkyl is reacted with an amount of said hydroalkylsiloxane that provides 1 to 2 fluoroalkylene groups per —SiH group in said unsaturated fluoroalkyl.

9. The method of claim 4, wherein said unsaturated fluoroalkyl is reacted with an amount of said hydroalkylsiloxane that provides 1.2 to 1.9 fluoroalkylene groups per —SiH group in said unsaturated fluoroalkyl.

10. The method of claim 4, wherein said unsaturated fluoroalkyl is reacted with an amount of said hydroalkylsiloxane that provides 1.5 to 1.8 fluoroalkylene groups per —SiH group in said unsaturated fluorosilicone.

11. The method of claim 4, wherein said hydroalkylsiloxane of formula (2) is reacted with said unsaturated fluoroalkyl of the formula (3) in the presence of a rhodium complex or metal carbonyl catalyst.

12. The method of claim 11, wherein said catalyst is a rhodium complex selected from the group consisting of RhCl(PPh$_3$)$_3$ and RhCl(CO)(PPh$_3$)$_2$.

13. The method of claim 11, wherein said catalyst is a carbonyl of nickel, rhodium, iron, ruthenium, manganese, iridium, chromium or molybdenum.

14. The method of claim 11, wherein said catalyst is dicobalt octacarbonyl.

15. The method of claim 11, wherein the amount of said catalyst expressed as a weight % of the amount of polyalkylhydrosiloxane is between about 0.5% to about 15%.

16. The method of claim 11, wherein the amount of said catalyst expressed as a weight % of the amount of polyalkylhydrosiloxane is between about 5% to about 10%.

17. The method of claim 4, wherein SiH groups of (4) are converted to Si—OH or Si—OR' groups by reaction with methanol in the presence of an organic transition metal salt catalyst selected from the group consisting of cobalt octoate, copper naphthenate and zinc octoate.

18. The method of claim 4, wherein SiH groups of (4) are converted to Si—OH or Si—OR' groups by reaction with methanol in the presence of a zinc octoate catalyst.

19. The method of claim 4, wherein SiH groups of (4) are converted to Si—OH or Si—OR' groups by reaction with methanol at a reaction temperature between about 0° C. to about 70° C.

20. The method of claim 4, wherein SiH groups of (4) are converted to Si—OH or Si—OR' groups by reaction with methanol at a reaction temperature between about 10° C. to about 50° C.

21. The method of claim 4, wherein SiH groups of (4) are converted to Si—OH or Si—OR' groups by reaction with methanol at a reaction temperature between about 20° C. to about 25° C.

22. The method of claim 4, further comprising crosslinking said silicon resin (1).

23. The method of claim 4, further comprising crosslinking said silicon resin (1) with another crosslinkable component.

24. The method of claim 23, wherein said crosslinkable component is an alkyltriethoxysilane, tetraethoxysilane or fluoroalkyltriethoxysilane.

25. The method of claim 23, wherein said crosslinkable component comprises 5% to 40% by weight fluoroalkyltriethoxysilane.

26. The method of claim 22, comprising crosslinking said silicon resin (1) at a reaction temperature between about 0° C. to about 70° C.

27. The method of claim 22, comprising crosslinking said silicon resin (1) at a reaction temperature between about 10° C. to about 50° C.

28. The method of claim 22, comprising crosslinking said silicon resin (1) at a reaction temperature between about 20° C. to about 25° C.

29. A method of preparing a fluoroalkyl group containing polyalkylhydrosiloxane of the following formula:

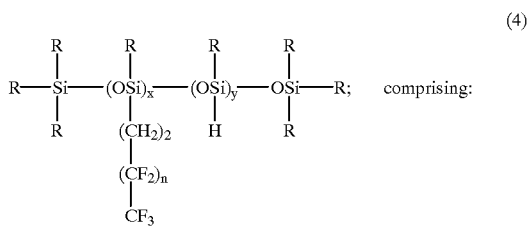

(4)

comprising:

reacting a hydroalkylsiloxane of the formula:

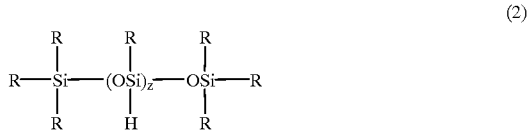

(2)

with an unsaturated fluoroalkyl of the formula:

(3)

wherein R is the same or different group and stands for an alkyl of 1 to 10 carbon atoms, n is 2 to 10, z is 3 to 200, x is 50 to 95% of z, and y is 50 to 5% of z.

30. A cured crosslinked reaction product of a curable fluorinated silicone resin, said curable fluorinated silicone resin comprising:

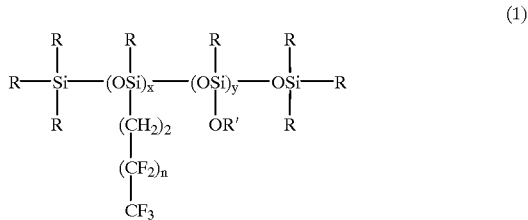

(1)

wherein R is the same or different group and stands for an alkyl of 1 to 10 carbon atoms, R' is H or a lower alkyl of 1 to 10 carbon atoms, n is 2 to 10, x is at least 1 and y is at least 2.

31. An article comprising a marine structure coated with a fouling release coating, which is the cured reaction product of the curable fluorinated silicone resin of claim 1 having crosslinkable Si—OR sites and any reaction products thereof.

* * * * *